United States Patent
Zaitman et al.

(10) Patent No.: US 12,386,754 B1
(45) Date of Patent: Aug. 12, 2025

(54) SYNERGISTIC DATA COMPRESSION

(71) Applicant: Dell Products L.P., Round Rock, TX (US)

(72) Inventors: Amit Zaitman, Shavey Shomron (IL); Uri Shabi, Tel Mond (IL); Aleksey Kabishcher, Milford, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/659,191

(22) Filed: May 9, 2024

(51) Int. Cl.
*G06F 12/0891* (2016.01)

(52) U.S. Cl.
CPC .................. *G06F 12/0891* (2013.01)

(58) Field of Classification Search
CPC .................................................. G06F 12/0891
See application file for complete search history.

(56) References Cited

U.S. PATENT DOCUMENTS

| | | | |
|---|---|---|---|
| 5,298,895 A | 3/1994 | Van Maren | |
| 5,652,857 A * | 7/1997 | Shimoi | G06F 3/0601 711/E12.019 |
| 5,951,623 A * | 9/1999 | Reynar | H03M 7/3086 358/1.9 |
| 5,990,810 A | 11/1999 | Williams | |
| 8,799,601 B1 | 8/2014 | Chen et al. | |
| 8,898,120 B1 | 11/2014 | Efstathopoulos | |
| 9,569,455 B1 | 2/2017 | Bono et al. | |
| 11,314,705 B2 * | 4/2022 | Gazit | G06F 16/215 |
| 2010/0274773 A1 * | 10/2010 | Pawar | G06F 16/9535 707/693 |
| 2023/0113436 A1 * | 4/2023 | Shabi | H03M 7/3064 707/693 |
| 2023/0126970 A1 * | 4/2023 | Jiang | G06F 12/127 711/141 |
| 2024/0020005 A1 * | 1/2024 | Liu | G06F 3/0608 |

* cited by examiner

*Primary Examiner* — Sean D Rossiter
(74) *Attorney, Agent, or Firm* — BainwoodHuang

(57) ABSTRACT

A flush set of data pages to flush from a cache to non-volatile data storage is identified, and a compression group is identified that is made up of similar data pages within the flush set. A previously compressed data page is identified in non-volatile data storage that is similar to the data pages in the compression group. Data compression is performed on the compression group using a compression dictionary for the previously compressed data page. A flush set specific hash index and a global hash index may be used to identify the similar data pages in the compression group and the similar previously compressed data page. An indication of the similar previously compressed data page may be stored in the compressed block generated for the compression group, and the compression dictionary for the previously compressed data page need not be duplicated in the non-volatile data storage.

19 Claims, 4 Drawing Sheets

SYNERGISTIC DATA COMPRESSION

TECHNICAL FIELD

The present disclosure relates generally to technology for data reduction in a data storage system, and more specifically to performing data compression when flushing a set of data pages from cache to non-volatile data storage.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

Data storage systems use data compression to efficiently utilize their non-volatile data storage resources. Lossless data compression technology may be used to reduce the size of a set of user data by identifying and eliminating redundancy within the data. Examples of lossless data compression technologies include Lempel-Ziv (LZ) compression methods, such as LZ77, LZ78, DEFLATE, gzip, zstandard, Lempel-Ziv-Welch (LZW), etc. LZ and similar data compression technologies are examples of dictionary-based data compression, and operate by generating a compression dictionary of repeated character sequences found in the data being compressed. Data compression using such technologies includes generating an encoding of the data being compressed by substituting compression dictionary entry identifiers ("codes") for instances of the character sequences contained in the compression dictionary that are found in the data.

SUMMARY

In the disclosed technology, a flush set of data pages to flush from a cache to non-volatile data storage is identified from within the cache. A compression group is then identified that is made up of data pages within the flush set that are similar. The disclosed technology also identifies a previously compressed data page that is stored in the non-volatile data storage and is similar to the data pages in the compression group. Data compression is performed on the compression group at least in part using a compression dictionary for the previously compressed data page.

In some embodiments, identifying the compression group includes, for each individual data page in the flush set, applying a similarity hash to the data page to obtain a similarity hash value corresponding to the data page. The compression group is then identified as a set of data pages within the flush set that each have the same corresponding similarity hash value.

In some embodiments, identifying the compression group includes generating a flush set hash index for the flush set. The flush set hash index is a searchable data structure that associates individual similarity hash values with corresponding data pages in the flush set. In such embodiments, the compression group is identified using the flush set hash index.

In some embodiments, identifying the previously compressed data page that is stored in the non-volatile storage and is similar to the data pages in the compression group includes identifying a previously compressed data page that is stored in the non-volatile storage and has the same corresponding similarity hash value as the data pages in the compression group.

In some embodiments, a global hash index is maintained for previously compressed data pages. The global hash index is a searchable data structure that associates individual similarity hash values with corresponding previously compressed data pages that are stored in the non-volatile data storage. In such embodiments, identifying the previously compressed data page that is similar to the data pages in the compression group is performed using the global hash index.

In some embodiments, the disclosed technology performs data compression on the compression group using the compression dictionary for the previously compressed data page at least in part by accessing the compression dictionary for the previously compressed data page once from the previously compressed data page in non-volatile data storage into memory to create a copy of the compression dictionary for the previously compressed data page in memory, and discarding the copy of the compression dictionary for the previously compressed data page from memory when data compression on the compression group has completed.

In some embodiments, the disclosed technology performs data compression on the compression group at least in part by generating a single compressed block that includes an indication of the previously compressed data page and an encoding of the data pages in the compression group, and storing the compressed block into the non-volatile data storage.

In some embodiments, generating the compressed block further includes generating an additional dictionary component to compress portions of data in the data pages of the compression group that are not similar to the previously compressed data page, storing the additional dictionary component in the compressed block.

In some embodiments, decompressing at least a portion of the compressed block to retrieve at least one of the data pages in the compression group includes accessing the compressed block in the non-volatile data storage, accessing the compression dictionary for the previously compressed data page based on the indication of the previously compressed data page stored in the compressed block, and decompressing at least a portion of the compressed block using the compression dictionary for the previously compressed data page.

The disclosed technology is integral to providing a practical technical solution to the problem of efficiently providing high levels of data compression in a data storage system. By identifying a compression group of similar data pages within a flush set, and then compressing the group together into a single compressed block, high compression ratios can be obtained. In addition, by utilizing the previously generated compression dictionary of a previously compressed data page that is similar to the data pages in the compression group during the compression of the compression group, the disclosed technology uses the synergy between the similar previously compressed data page and the similar data pages in the compression group to reduce the data storage system resources required to compress the compression group. Advantageously, the previously generated compression dictionary need not be stored again when the compressed block generated for the compression group is stored, as it remains persistently stored in association with (e.g. within) the similar previously compressed data page. Further improvement may be obtained during data retrieval with regard to the data pages in the compression group, since the compression dictionary for the previously compressed data page may be accessed again for data decompression using the indication of the previously compressed data page stored in the compressed block for the compression group.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
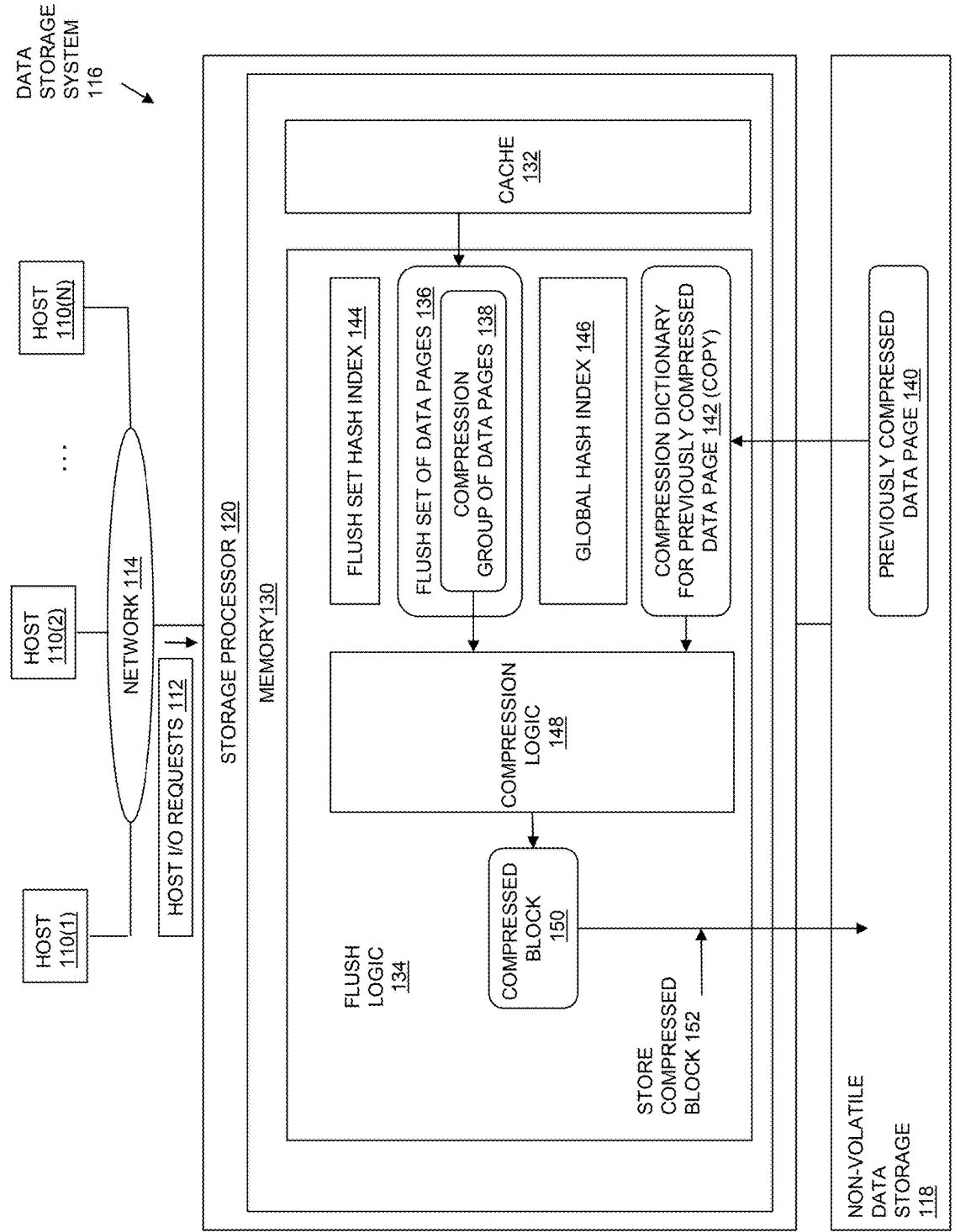
FIG. 1 is a block diagram showing an illustrative embodiment of the disclosed technology.

Embodiments will now be described with reference to the figures. The embodiments described herein are not limiting, and are provided only as examples, in order to illustrate various features and principles of the disclosed technology. The embodiments of disclosed technology described herein are integrated into a practical solution to the problem of efficiently obtaining high levels of data compression in a data storage system.

The disclosed technology operates by identifying a flush set of data pages to flush from a cache to non-volatile data storage, and then identifying a compression group within the flush set that is made up of similar data pages. A similar previously compressed data page is also identified. The previously compressed data page is stored in the non-volatile data storage and is similar to the data pages in the compression group. Data compression is performed on the compression group using a compression dictionary that was previously generated for the similar previously compressed data page.

The compression group may be identified by, for each individual data page in the flush set, applying a similarity hash to that data page to obtain a corresponding similarity hash value. The compression group may be identified as a set of multiple data pages within the flush set that each have the same corresponding similarity hash value.

The compression group may be identified by generating a flush set hash index for the flush set. The flush set hash index is a searchable data structure that associates individual similarity hash values with corresponding data pages in the flush set. The compression group may be identified using the flush set hash index generated for the flush set.

The previously compressed data page that is stored in the non-volatile storage and is similar to the data pages in the compression group may be identified by identifying a previously compressed data page that is stored in the non-volatile storage and has the same corresponding similarity hash value as the data pages in the compression group. To this end, a global hash index may be maintained for previously compressed data pages. The global hash index is a searchable data structure that associates individual similarity hash values with corresponding previously compressed data pages that are stored in the non-volatile data storage. Accordingly, identification of the previously compressed data page that is similar to the data pages in the compression group may be performed using the global hash index, and without having to decompress the previously compressed data page.

Data compression may be performed on the compression group using the compression dictionary generated for the previously compressed data page at least in part by accessing the compression dictionary for the previously compressed data page once, e.g. reading the compression dictionary generated for the previously compressed data page into memory from within the previously compressed data page stored in non-volatile data storage, in order to create a memory copy of the compression dictionary generated for the previously compressed data page. The copy of the compression dictionary generated for the previously compressed data page from memory is then discarded when data compression on the compression group has completed.

Data compression on the compression group may be performed by generating a single compressed block that includes an indication of the previously compressed data page and an encoding of all the data pages in the compression group. The compressed block is then stored in the non-volatile data storage.

The compressed block may further be generated by generating an additional dictionary component to compress portions of data in the data pages of the compression group that are not similar to the previously compressed data page, and storing the additional dictionary component within the compressed block.

Decompressing at least a portion of the compressed block to retrieve the uncompressed version of at least one of the data pages in the compression group may include accessing the compressed block in the non-volatile data storage, accessing the compression dictionary for the previously compressed data page based on the indication of the previously compressed data page stored in the compressed block, and decompressing at least a portion of the compressed block using the compression dictionary for the previously compressed data page.

FIG. 1 shows an example of an operational environment in which embodiments of the disclosed technology may operate, and an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile data storage provided by Data Storage System 116, e.g. over Network 114. Data Storage System 116 includes at least one Storage Processor 120 and Non-Volatile Data Storage 118. Data Storage System 116 may include one or more storage processors like Storage Processor 120. Storage Processor 120 may be any type of physical or virtual computing device that is capable of processing host I/O requests.

Non-Volatile Data Storage 118 may include or consist of solid state drives (SSDs), and/or some other specific type of storage drives, such as magnetic disk drives, electronic flash drives, optical drives, and/or other specific types of non-volatile data storage drives or devices.

Network 114 may include or consist of any specific type of computer/communication network and/or combination of networks.

Hosts 110(1-N) and/or host applications executing in whole or in part on Hosts 110(1-N) logically connect to and communicate with the Storage Processor 120. For example, Host I/O Requests 112 conveyed from Hosts 110(1-N) to Storage Processor 120 may include block I/O requests and/or file I/O requests. Storage Processor 120 may be configured to receive host I/O requests through block-based and/or file-based storage protocols, and to respond to host I/O requests of either type by reading host data from and/or writing host data to the Non-Volatile Data Storage 118.

Storage Processor 120 includes Processing Circuitry 124, Memory 130, and communication interfaces. The communication interfaces may include adapters or the like that convert electronic and/or optical signals received over Network 114 into electronic form for use by Storage Processor 120. Processing Circuitry 124 may be embodied as at least one processor core that is capable of independently reading and executing threads of program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120. Memory 130 may include both volatile memory (e.g., RAM), and/or non-volatile memory (e.g. ROM, disk drives, solid state drives, portions of Non-Volatile Storage 118, etc.).

Processing Circuitry 124 and Memory 130 together form specialized control circuitry, which is constructed and arranged to carry out the specific methods and functions described herein. As shown in FIG. 1, Memory 130 stores software components and data structures that may be provided at least in part in the form of executable program instructions. When the executable instructions of the software components shown in FIG. 1 are executed by Processing Circuitry 124, Processing Circuitry 124 performs the methods and functionality of the disclosed technology. Although certain specific software components are shown in FIG. 1, those skilled in the art will recognize that Memory 130 may further include various other specific software components, which are not shown.

In the example of FIG. 1, for purposes of illustration, the software components in Memory 130 include Flush Logic 134, which provides program logic for flushing data from Cache 132 into Non-Volatile Data Storage 118.

During operation of the illustrative embodiment shown in FIG. 1, Flush Logic 134 identifies Flush Set of Data Pages 136 within Cache 132, for the purpose of flushing Flush Set of Data Pages 136 from Cache 132 to Non-Volatile Data Storage 118. The data pages in Flush Set of Data Pages 136 are dirty pages of host data in Cache 132 that need to be written to Non-Volatile Data Storage 118, and may be identified based on various factors. For example, the data pages in each Flush Set of Data Pages 136 may be selected at least in part based on data access patterns of Hosts 110, a duration of time the data pages have been stored in Cache 132, a fullness level of Cache 132, current availability of processing and/or other resources within Storage Processor 120, and/or the logical proximity of the logical addresses of the data pages. Flush Set of Data Pages 136 may contain any specific number of data pages. Each data page may, for example, consist of 4 KB (four kilobytes) of host data. The disclosed technology is not limited in this regard, and any other specific page size may be used in the alternative.

Flush Logic 134 performs data compression on some or all of the data pages in Flush Set of Data Blocks 136, e.g. using Compression Logic 148. In some embodiments, Flush Logic 134 also deduplicates the data pages in Flush Set of Data Blocks 136, before using Compression Logic 148 to compress the data pages that remain in Flush Set of Data Blocks 136 after deduplication.

Further during operation, Flush Logic 134 identifies Compression Group of Data Pages 138 within Flush Set of Data Pages 136. Compression Group of Data Pages 138 is made up of some number of data pages within Flush Set of Data Pages 136 that Flush Logic 134 determines are similar to each other. Compression Group Of Data Pages 138 may, for example, consist of only a portion (i.e. less than all) of the data pages in Flush Set of Data Pages 136. Flush Logic 134 may identify the data pages contained in Compression Group of Data Pages 138 by, for each individual data page in Flush Set of Data Pages 136, applying a similarity hash to the data page in order to obtain a similarity hash value corresponding to the data page. The similarity hash used may be any specific hash function that provides similarity hash values such that application of the hash function to sufficiently similar data pages has a high probability of returning the same similarity hash value. Accordingly, any data pages having the same similarity hash value are highly likely to be similar to each other. It is not necessary that data pages be completely identical in order for them to result in the same similarity hash value, only that the data pages be similar to each other to a predetermined degree. The specific amount of similarity between data pages that is required to result in the same similarity hash value may be an adjustable parameter. After applying the similarity hash function to each one of the data pages in Flush Set of Data Pages 136, Flush Logic 134 identifies Compression Group of Data Pages 138 as a set of multiple data pages within Flush Set of Data Pages 136 that each have the same corresponding similarity hash value.

In order to support efficient identification of Compression Group of Data Pages 138 within Flush Set of Data Pages 136, Flush Logic 134 may also generate Flush Set Hash Index 144 for the Flush Set of Data Pages 136. Flush Set Hash Index 144 is a searchable data structure that associates individual similarity hash values with corresponding data pages in Flush Set of Data Pages 136. Compression Group of Data Pages 138 can then be identified using Flush Set Hash Index 144, e.g. by finding a set of data pages in Flush Set of Data Pages 136 that all have the same corresponding similarity has value.

Flush Logic 134 also identifies a previously compressed data page that is i) stored in Non-Volatile Data Storage 118, and ii) is similar to the data pages in Compression Group of Data Pages 138. For example, Flush Logic 134 identifies Previously Compressed Data 138. For example, Flush Logic 134 may identify Previously Compressed Data Page 140 be determining that Previously Compressed Data Page 140 has the same corresponding similarity hash value as the data pages in the compression group. To support identification of a similar previously compressed data page, Flush Logic 134 may maintain a global hash index for previously compressed data pages, shown by Global Hash Index 146. Global Hash Index 146 is a searchable data structure that associates individual similarity hash values with corresponding previously compressed data pages that are stored in Non-Volatile Data Storage 118. Flush Logic 134 may identify Previously Compressed Data Page 140 as being similar to the data pages in Compression Group of Data Pages 138 by searching the Global Hash Index 146 using the similarity hash value obtained for each of the data pages in Compression Group of Data Pages 138. Such a search returns an identifier for any previously compressed data page that is similar to the data pages in Compression Group of Data Pages 140, e.g. an identifier of Previously Compressed Data Page 140.

Flush Logic 134 then performs a single data compression operation for all of the data pages contained in Compression Group of Data Pages 138, at least in part using a compression dictionary that was previously generated for Previously Compressed Data Page 140. For example, the data compression operation performed on the Compression Group of Data Pages 138 may be performed using Compression Logic 148. Any specific type of dictionary-based, lossless data compression may be used. In order to perform the compression operation on Compression Group of Data Pages 138 using the compression dictionary that was previously generated for Previously Compressed Data Page 140, Flush Logic 134 may read the compression dictionary for Previously Compressed Data Page 140 from within the compressed block storing Previously Compressed Data Page 140 in Non-Volatile Data Storage into Memory 130 to create a copy of the compression dictionary for Previously Compressed Data Page 140, as shown by Compression Dictionary for Previously Compressed Data Page 142. Flush Logic 142 then passes Compression Dictionary for Previously Compressed Data Page 142 together with Compression Group of Data Pages 138 to Compression Logic 148 in order for Compression Logic 148 to compress Compression Group of Data Pages 138 at least in part using Compression Dictionary for Previously Compressed Data Page 142. When compression of Compression Group of Data Pages 138 has completed, Flush Logic 134 discards Compression Dictionary for Previously Compressed Data Page 142 from Memory 130, in order to free up memory space.

As further shown in FIG. 1, Flush Logic 134 uses Compression Logic 148 to compress the data pages in Compression Group of Data Pages 138 into a single compressed block, shown by Compressed Block 150. Compressed Block 150 includes an indication (e.g. identifier, name, address, and/or offset or the like) of Previously Compressed Data Page 140, e.g. an indication of the location of the compressed block storing Previously Compressed Data Page 140 in Non-Volatile Data Storage 118. Compressed Block 150 further includes an encoding of the data pages in Compression Group of Data Pages 138 that was generated by Compression Logic 148 at least in part using Compression Dictionary for Previously Compressed Data Page 142. Flush Logic 134 then stores Compressed Block 150 into Non-Volatile Data Storage 118, as indicated by reference number 152.

Generation of Compressed Block 150 by Flush Logic 134 using Compression Logic 148 may further include generating an additional dictionary component to compress portions of the data in the data pages in Compression Group of Data Pages 138 that are not similar to the data in Previously Compressed Data Page 140. The additional dictionary component may also be stored in Compressed Block 150. During compression of Compression Group of Data Pages 138, encodings of the portions of data in Compression Group of Data Pages 138 that are dissimilar to Previously Compressed Data Page 140 may be generated based on the additional dictionary component, and are also stored in Compressed Block 150.

Subsequent decompression of at least a portion of Compressed Block 150 to retrieve at least one of the data pages in Compression Group of Data Pages 138 may include accessing Compressed Block 150 in Non-Volatile Data Storage 118, accessing the compression dictionary generated for Previously Compressed Data Page 140 based on the indication of Previously Compressed Data Page 140 that was stored in Compressed Block 150, and decompressing at least a portion of Compressed Block 150 using the compression dictionary for Previously Compressed Data Page 140. In some embodiments, when only an individual data page of Compression Group of Data Pages 138 is to be retrieved, e.g. in response to a host read request, only the portion of Compressed Block 150 that contains the compressed data (i.e. encodings) for that individual data page is decompressed at least in part using the compression dictionary for Previously Compressed Data Page 140, without decompression of the other compressed data that was generated for the other data pages in Compression Group of Data Pages 138 and stored within the Compressed Block 150.

Figure 2:
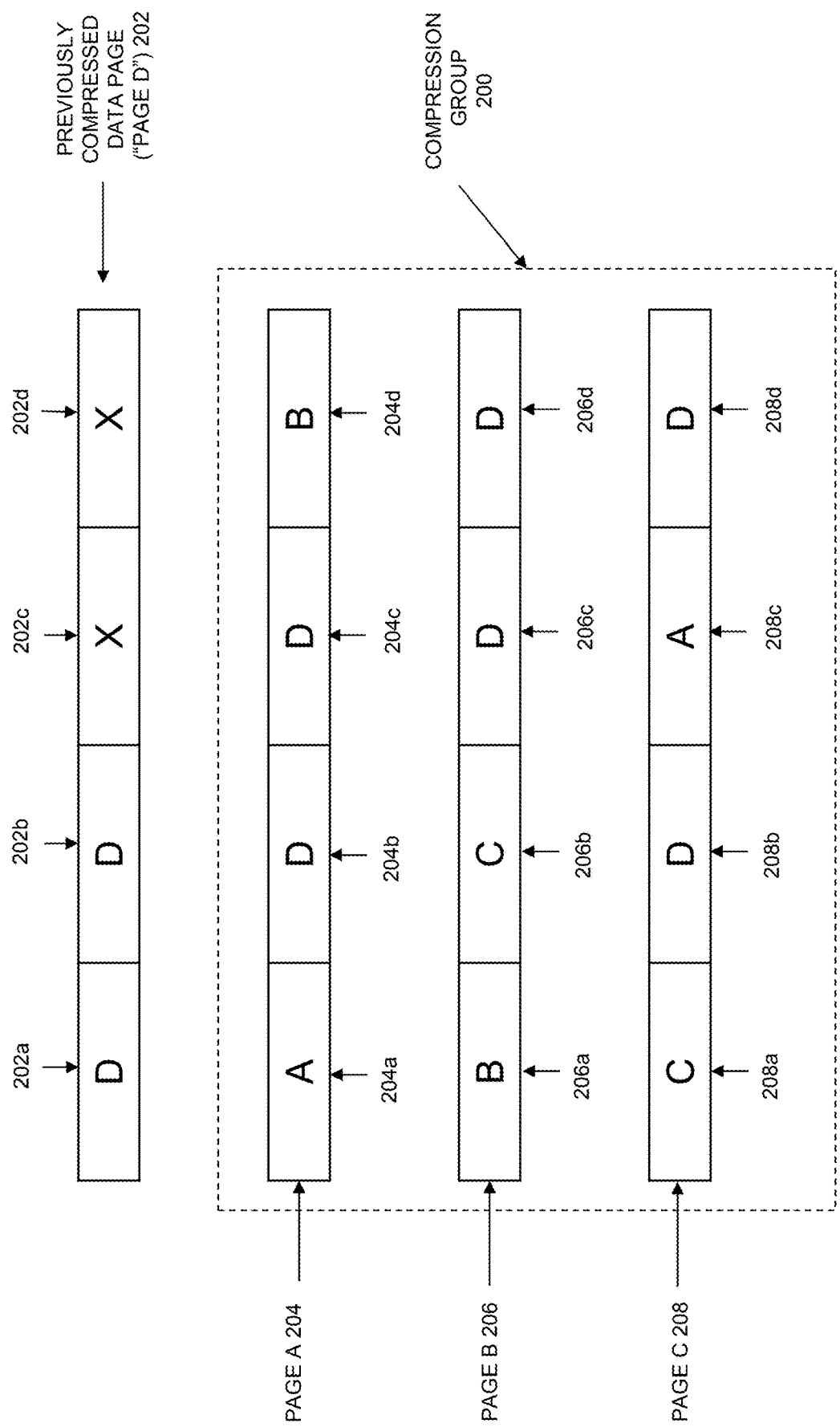
FIG. 2 is a block diagram showing an example of the uncompressed data stored in a compression group and a similar previously compressed data page in an example of operation of the disclosed technology.

FIG. 2 is a block diagram showing an example of data stored in a compression group of data pages ("Compression Group 200") and within a previously compressed data page ("Page D 202") that is determined to be similar to the data pages in Compression Group 200 during an operational example. While Page D 202 has previously been compressed at the time it is determined to be similar to the data pages in Compression Group 200, the example of FIG. 2 illustrates and refers to the uncompressed version of Page D 202, in order to explain the operation of the disclosed technology. In the example of FIG. 2, the Compression Group 200 includes three uncompressed data pages, i.e. Page A 204, Page B 206, and Page C 208. The contents of each uncompressed data page shown in FIG. 2 is described in terms of four 1 KB sections within that data page. For example, Page A 204 is made up of the four 1 KB sections 204a, 204b, 204c, and 204d, Page B 206 is made up of the four 1 KB sections 206a, 206b, 206c, and 206d, and Page C 208 is made up of the four 1 KB sections 208a, 208b, 208c, and 208d, and Page D 202 is made up of the four 1 KB sections 202a, 202b, 202c, and 202d.

In the example of FIG. 2, sections 202a and 202b in Page D 202 contain data "D", which is the same as or similar to the data "D" contained in sections 204b and 204c of Page A 204, sections 206c and 206d of Page B 206, and sections 208b and 208d of Page C 208. Sections 202c and 202d of Page D 202 contain data that is unique to Page D 202, e.g. the data "X".

Section 204a in Page A 204 contains data "A", which is the same as or similar to the data "A" contained in section 208c of Page C 208. Section 204d in Page A 204 contains data "B", which is the same as or similar to the data "B" contained in section 206a of Page B 206.

Section 206b in Page B 206 contains data "C", which is the same as or similar to the data "C" contained in section 208a of Page C 208.

The total uncompressed size of Page A 204 (4 KB), Page B 206 (4 KB), Page C 208 (4 KB), and Page D 202 (4 KB) is 16 KB. Using the technology disclosed herein, during compression of the Compression Group 200, the 2 KB of data "D" in sections 204b and 204c of Page A 204, sections 206c and 206d of Page B 206, and sections 208b and 208d of Page C 208, that is the same as or similar to the 2 KB of data "D" in Page D 202, is compressed using the compression dictionary that was previously generated and used when Page D 202 was previously compressed. With an 80% data reduction, the 2 KB of data "D" in each one of Page A 204, Page B 206, Page C 208, and Page D 202 (8 KB total) is reduced to 0.4 KB of compressed data for each page one of Page A 204, Page B 206, Page C 208, and Page D 202 (1.6 KB total).

The 2 KB of data "A" in section 204a of Page A 204 and section 208c of Page C 208, the 2 KB of data "B" in section 204d in Page A 204 and section 206a in Page B 206, and the 2 KB of data "C" in section 206b in Page B 206 and section 208a in Page C 208, are not the same as or similar to the data in Page D 202, and accordingly are not compressed using the compression dictionary that was previously generated when Page D 202 was previously compressed. Instead, those sections of Page A 204, Page B 206, and Page C 208 are compressed using an additional dictionary component that is generated during the compression of Compression Group 200, based on data "A", "B", and "C". With an 80% data reduction, the 6 KB of uncompressed data "A", "B", and "C" in Page A 204, Page B 206, and Page C 208 is reduced to 0.4 KB of compressed data for each page (1.2 KB total).

Accordingly, in a system that includes the disclosed technology, the size of the compressed data for Page A 204, Page B 206, Page C 208, and Page D 202 is:

1.6 KB (compressed data "D")+1.2 KB (compressed data "A", "B", and "C")+2 KB (unique data "X" in Page D 202)=4.8 KB for a data reduction of 16 KB-4.8 KB=11.2 KB.

Figure 3:
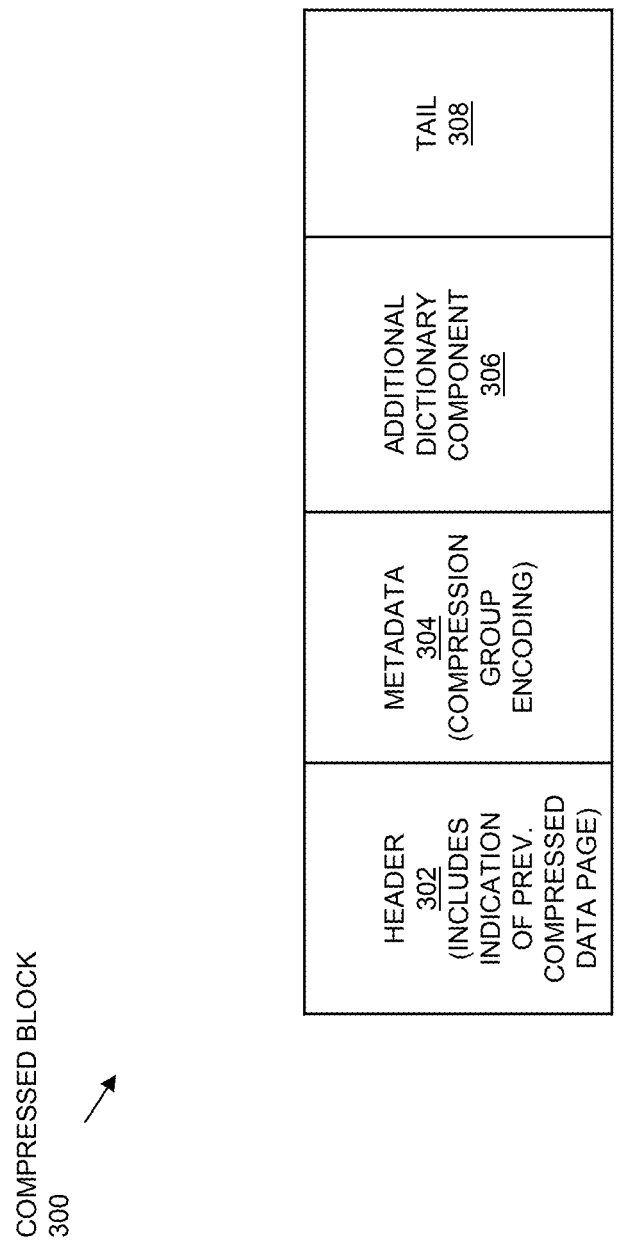
FIG. 3 is a block diagram showing an example of a compressed block generated by the disclosed technology.

FIG. 3 is a block diagram showing an example of a Compressed Block 300 generated by the disclosed technology to compress a corresponding compression group of data pages during a flush operation. The Compressed Block 300 is an example of the Compressed Block 150 in FIG. 1.

As shown in the example of FIG. 3, Compressed Block 300 includes a Header 302, Metadata 304, Additional Dictionary Component 306, and Tail 308. Header 302 may include an indication of the previously compressed data page that was identified as similar to the corresponding compression group for which Compressed Block 300 was generated, e.g. an identifier, name, address, and/or offset or the like that enables the compression dictionary for the similar previously compressed data page to be retrieved when one or more of the data pages in the corresponding compression group needs to be retrieved and decompressed. Alternatively, such an indication may be included in some other part of Compressed Block 300. Header 302 may also include system specific information, such an indication of the specific compression algorithm used to compress the corresponding compression group, and/or other system specific information.

Metadata 304 includes an encoding of the data in the data pages of the corresponding compression group, e.g. an encoding of the data in the data pages of the corresponding compression group generated based on mappings between compression dictionary entry identifiers and data sequences contained in the compression dictionary for the similar previously compressed data page, and/or based on mappings between compression dictionary entry identifiers and data sequences contained in the Additional Dictionary Component 306.

Additional Dictionary Component 306 contains mappings between dictionary entries and data sequences generated when portions of the data in the data pages of the corresponding compression group were compressed that were not similar to the data in the previously compressed data page.

Tail 308 includes additional system specific information, e.g. data verification information such as one or more checksums or the like for the contents of Compressed Block 300.

Figure 4:
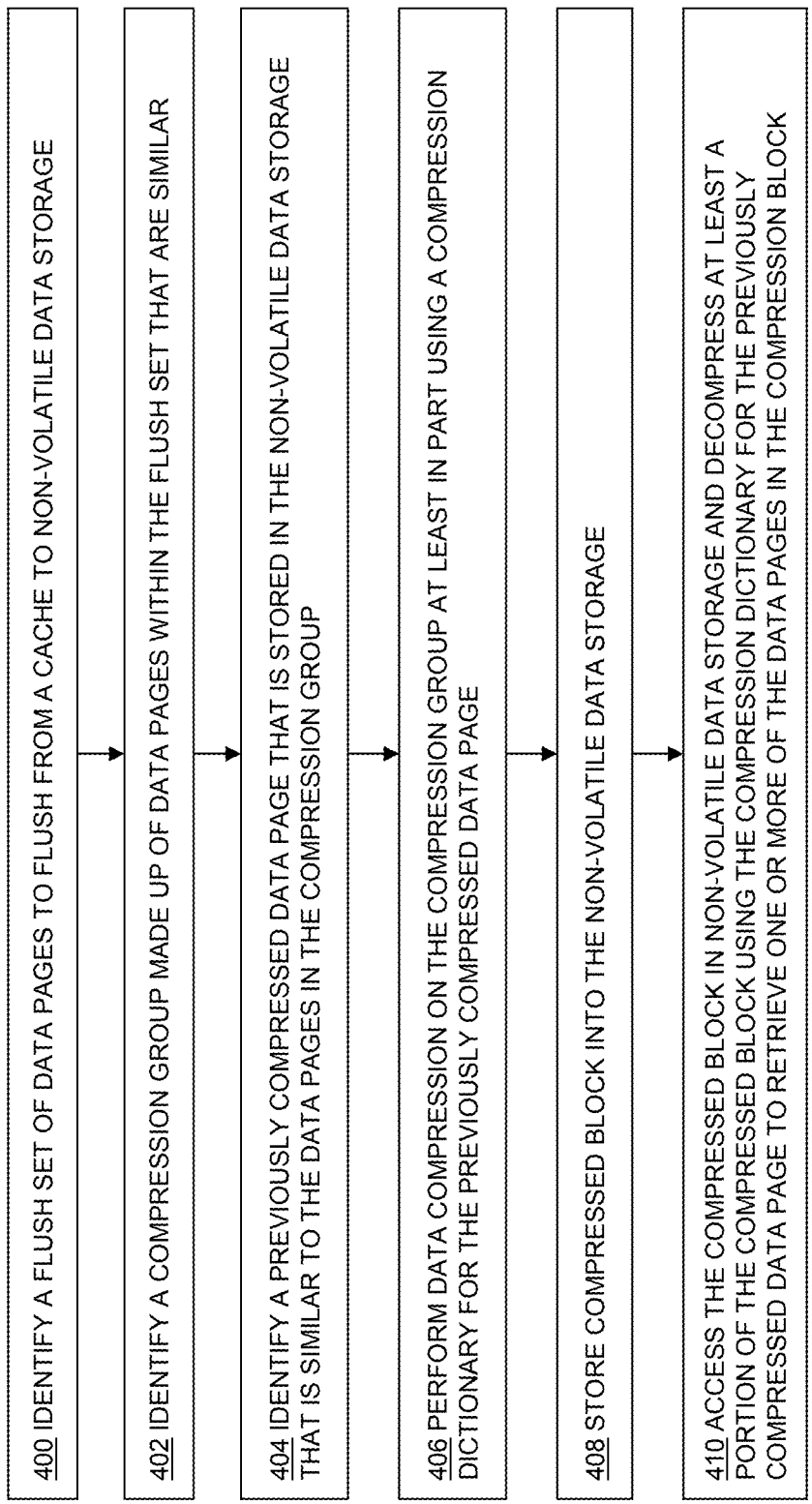
FIG. 4 is a flow chart showing an example of steps performed in some embodiments.

FIG. 4 is a flow chart showing an example of steps performed in some embodiments.

At step 400, a flush set of data pages is identified to flush from a cache to non-volatile data storage.

At step 402, a compression group is identified that is made up of data pages within the flush set that are similar to each other.

At step 404, a previously compressed data page is identified that is stored in the non-volatile data storage that is similar to the data pages in the compression group.

At step 406, a single data compression operation is performed on all the data pages in the compression group at least in part using a compression dictionary generated for the previously compressed data page.

At step 408, a compressed block generated at step 406 is stored into the non-volatile data storage.

At step 410, the compressed block is accessed in non-volatile data storage and at least a portion of the compressed block is decompressed using the compression dictionary for the previously compressed data page to retrieve one or more of the data pages in the compression block.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
identifying a flush set of data pages to flush from a cache to non-volatile data storage;
identifying a compression group made up of data pages within the flush set that are similar;
identifying a previously compressed data page that is stored in the non-volatile data storage that is similar to the data pages in the compression group; and
performing data compression on the compression group at least in part using a compression dictionary for the previously compressed data page.

2. The method of claim 1, wherein identifying the compression group further comprises:
for each individual data page in the flush set, applying a similarity hash to the data page to obtain a similarity hash value corresponding to the data page; and
identifying the compression group as a plurality of data pages within the flush set that have the same corresponding similarity hash value.

3. The method of claim 2, wherein identifying the compression group further comprises:
generating a flush set hash index for the flush set, wherein the flush set hash index is a searchable data structure that associates individual similarity hash values with corresponding data pages in the flush set; and
identifying the compression group using the flush set hash index.

4. The method of claim 3, wherein identifying the previously compressed data page that is stored in the non-volatile storage and is similar to the data pages in the compression group comprises identifying a previously compressed data page that is stored in the non-volatile storage and has the same corresponding similarity hash value as the data pages in the compression group.

5. The method of claim 4, further comprising:
maintaining a global hash index for previously compressed data pages, wherein the global hash index is a searchable data structure that associates individual similarity hash values with corresponding previously compressed data pages that are stored in the non-volatile data storage; and
identifying the previously compressed data page that is similar to the data pages in the compression group using the global hash index.

6. The method of claim 5, wherein performing the data compression on the compression group using the compression dictionary for the previously compressed data page further comprises:
accessing the compression dictionary for the previously compressed data page once from the previously compressed data page in non-volatile data storage into memory to create a copy of the compression dictionary for the previously compressed data page in memory; and
discarding the copy of the compression dictionary for the previously compressed data page from memory when data compression on the compression group has completed.

7. The method of claim 6, further comprising:
performing data compression on the compression group at least in part by generating a compressed block that includes an indication of the previously compressed data page and an encoding of the data pages in the compression group; and
storing the compressed block into the non-volatile data storage.

8. The method of claim 7, wherein generating the compressed block further comprises:
generating an additional dictionary component to compress portions of data in the data pages of the compression group that are not similar to the previously compressed data page; and
storing the additional dictionary component in the compressed block.

9. The method of claim 8, further comprising decompressing at least a portion of the compressed block to retrieve at least one of the data pages in the compression group, wherein decompressing at least a portion of the compressed block comprises:
accessing the compressed block in the non-volatile data storage;
accessing the compression dictionary for the previously compressed data page based on the indication of the previously compressed data page stored in the compressed block; and
decompressing at least a portion of the compressed block using the compression dictionary for the previously compressed data page.

10. A data storage system, comprising:
processing circuitry and memory coupled to the processing circuitry, the memory storing instructions, wherein the instructions, when executed by the processing circuitry, cause the processing circuitry to:
identify a flush set of data pages to flush from a cache to non-volatile data storage;
identify a compression group made up of data pages within the flush set that are similar;
identify a previously compressed data page that is stored in the non-volatile data storage that is similar to the data pages in the compression group; and
perform data compression on the compression group at least in part using a compression dictionary for the previously compressed data page.

11. The data storage system of claim 10, wherein the program code, when executed by the processing circuitry, causes the processing circuitry to identify the compression group by causing the processing circuitry to:

for each individual data page in the flush set, apply a similarity hash to the data page to obtain a similarity hash value corresponding to the data page; and identify the compression group as a plurality of data pages within the flush set that have the same corresponding similarity hash value.

12. The data storage system of claim 11, wherein the program code, when executed by the processing circuitry, further causes the processing circuitry to identify the compression group by causing the processing circuitry to:

generate a flush set hash index for the flush set, wherein the flush set hash index is a searchable data structure that associates individual similarity hash values with corresponding data pages in the flush set; and identify the compression group using the flush set hash index.

13. The data storage system of claim 12, wherein the previously compressed data page that is stored in the non-volatile storage and is similar to the data pages in the compression group is identified by identifying a previously compressed data page that is stored in the non-volatile storage and has the same corresponding similarity hash value as the data pages in the compression group.

14. The data storage system of claim 13, wherein the program code, when executed by the processing circuitry, further causes the processing circuitry to:

maintain a global hash index for previously compressed data pages, wherein the global hash index is a searchable data structure that associates individual similarity hash values with corresponding previously compressed data pages that are stored in the non-volatile data storage; and identify the previously compressed data page that is similar to the data pages in the compression group using the global hash index.

15. The data storage system of claim 14, wherein the program code, when executed by the processing circuitry, causes the processing circuitry to perform the data compression on the compression group using the compression dictionary for the previously compressed data page by causing the processing circuitry to:

access the compression dictionary for the previously compressed data page once from the previously compressed data page in non-volatile data storage into memory to create a copy of the compression dictionary for the previously compressed data page in memory; and discard the copy of the compression dictionary for the previously compressed data page from memory when data compression on the compression group has completed.

16. The data storage system of claim 15, wherein the program code, when executed by the processing circuitry, further causes the processing circuitry to:

perform data compression on the compression group at least in part by generating a compressed block that includes an indication of the previously compressed data page and an encoding of the data pages in the compression group; and store the compressed block into the non-volatile data storage.

17. The data storage system of claim 16, wherein the program code, when executed by the processing circuitry, further causes the processing circuitry to generate the compressed block by causing the processing circuitry to:

generate an additional dictionary component to compress portions of data in the data pages of the compression group that are not similar to the previously compressed data page; and store the additional dictionary component in the compressed block.

18. The data storage system of claim 17, wherein the program code, when executed by the processing circuitry, further causes the processing circuitry to decompress at least a portion of the compressed block to retrieve at least one of the data pages in the compression group, and wherein the program code, when executed by the processing circuitry, further causes the processing circuitry to decompress at least a portion of the compressed block by causing the processing circuitry to:

access the compressed block in the non-volatile data storage;

access the compression dictionary for the previously compressed data page based on the indication of the previously compressed data page stored in the compressed block; and decompress at least a portion of the compressed block using the compression dictionary for the previously compressed data page.

19. A computer program product, comprising:

a non-transitory, computer-readable medium having instructions stored thereon that, when executed by processing circuitry in a data storage system, cause the processing circuitry to perform a method comprising the steps of:

identifying a flush set of data pages to flush from a cache to non-volatile data storage;

identifying a compression group made up of data pages within the flush set that are similar;

identifying a previously compressed data page that is stored in the non-volatile data storage that is similar to the data pages in the compression group; and performing data compression on the compression group at least in part using a compression dictionary for the previously compressed data page.

* * * * *